United States Patent Office 3,170,802
Patented Feb. 23, 1965

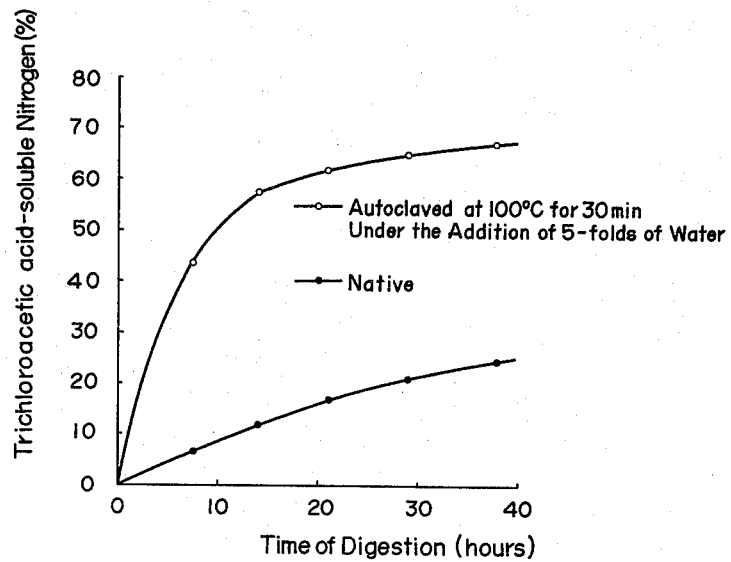
Fig 1. Hydrolysis of Soybean Flour Protein by Protease of Aspergillus sojae
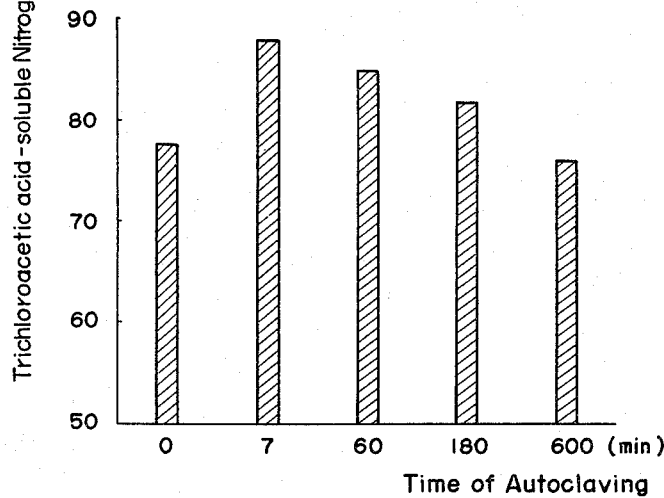
Fig 2. Digestion of Soybean Flour Protein Autoclaved at 120°C Under the Addition of 5- Folds of Water
(Nine Days Digestion of Protease of Aspergillus sojae)

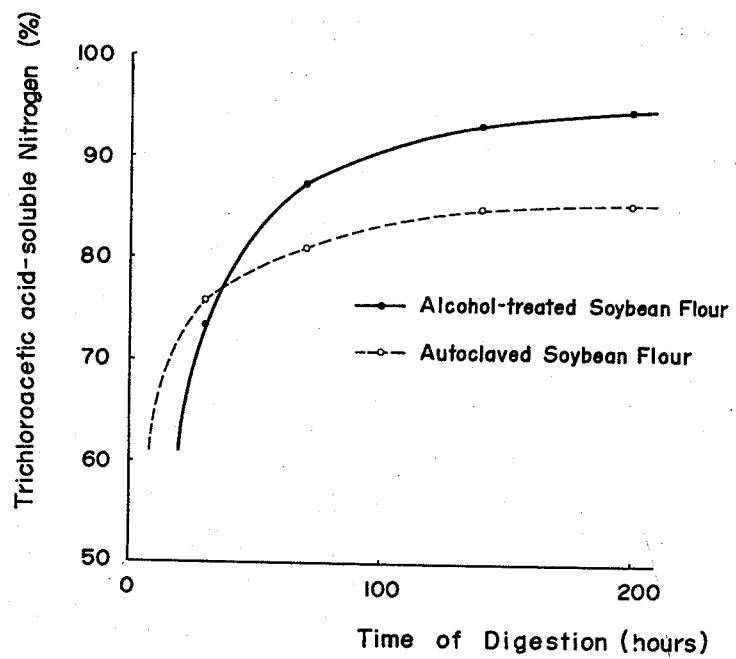
Fig 3. Digestion of Soybean Flour by Protease of Aspergillus sojae.

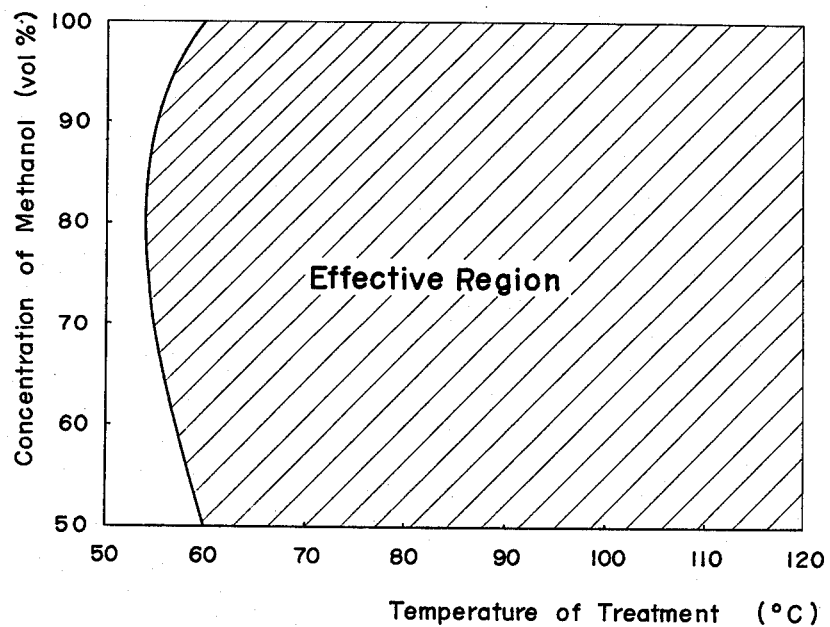
Fig 4. Effective Region for Treatment by Methanol

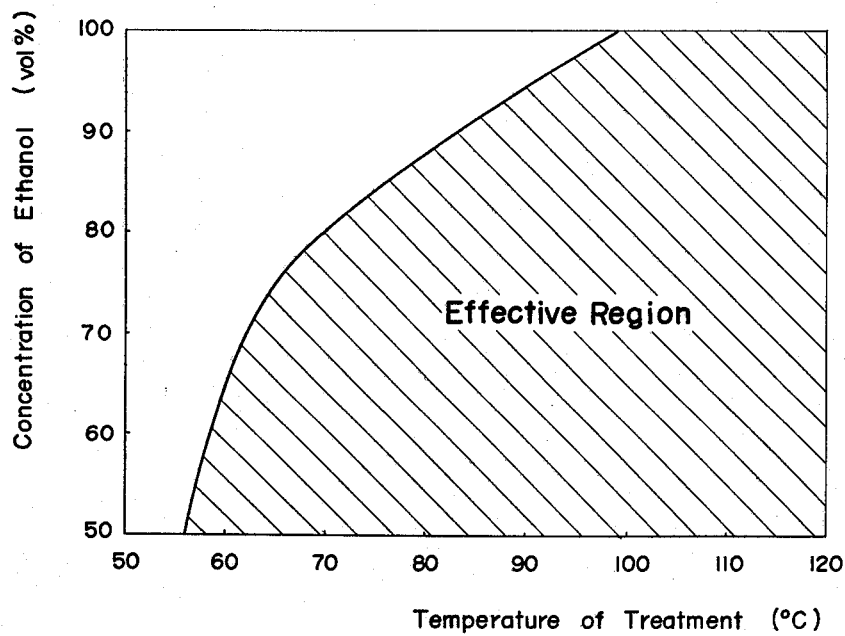
Fig 5. Effective Region for Treatment by Ethanol

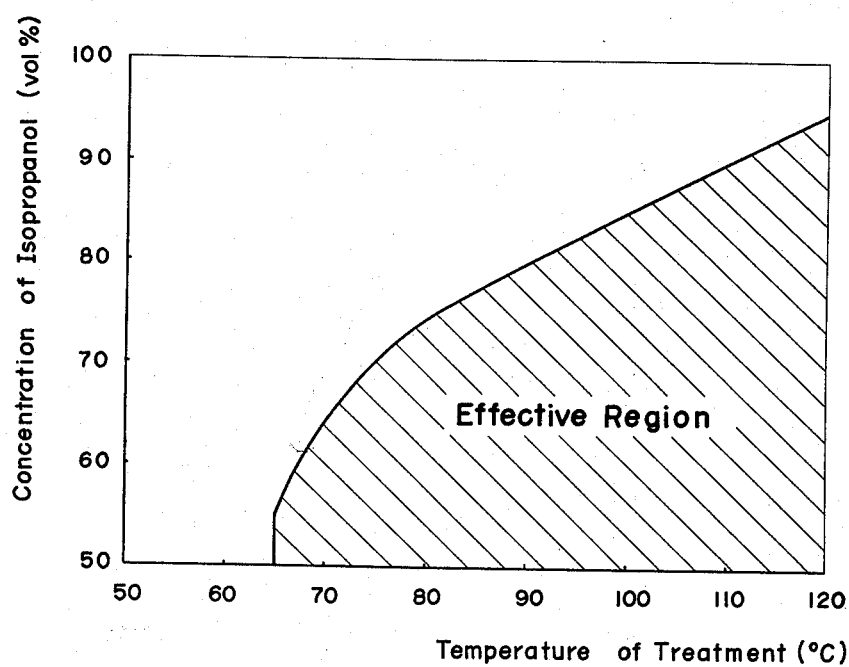
Fig 6. Effective Region for Treatment by Isopropanol

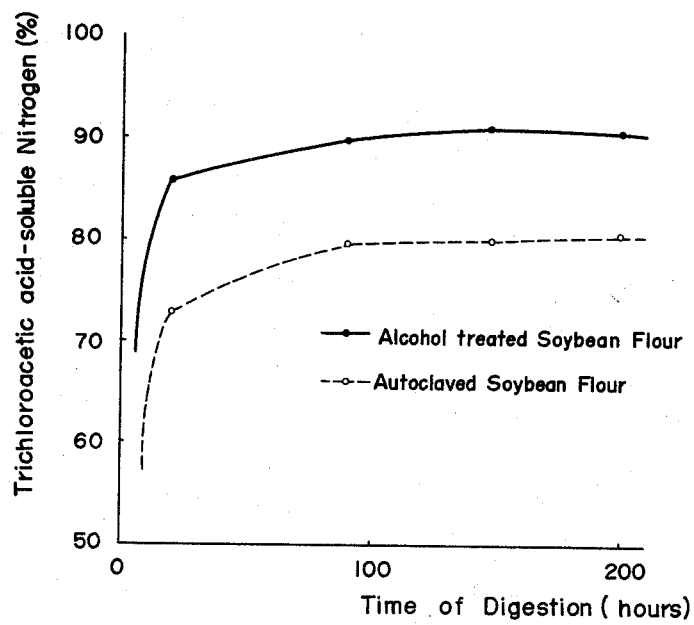
Fig 7. Digestion of Soybean Flour Protein by Pepsin
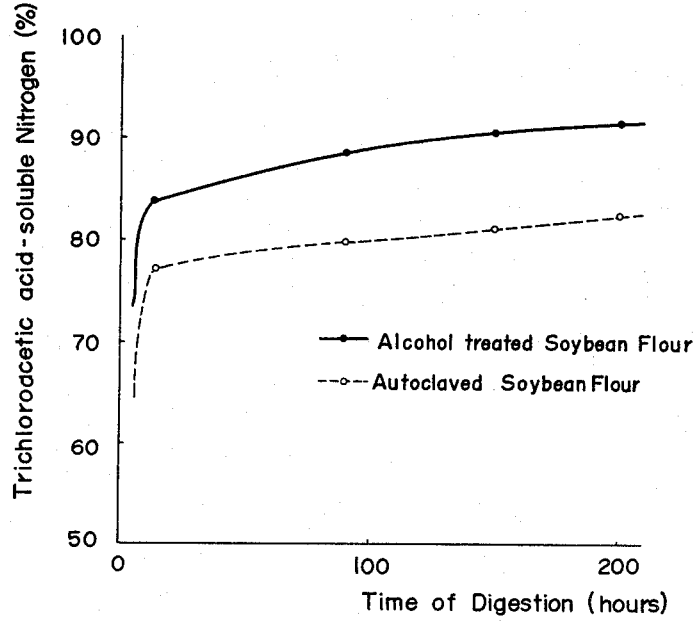
Fig 8. Digestion of Soybean Flour Protein by Papain

3,170,802
METHOD FOR TREATMENT OF SOYBEAN PROTEINS
Danji Fukushima, Yono-shi, Saitama-ken, Japan, assignor to Zaidan Hojin Noda Sangyo Kagaku Kenkyusho, Chiba-ken, Japan
Filed Dec. 14, 1960, Ser. No. 75,799
7 Claims. (Cl. 99—145)

This invention relates to the method for treatment of soybean proteins, comprising treating soybeans or defatted soybeans with aqueous lower alcohol solutions of more than 50% by volume at the temperature of 54–120° C., and then removing the said alcohol solutions.

The invention relates to the method for treatment of soybean proteins, comprising treating soybeans or defatted soybeans with the vapour of lower alcohols or the said alcohol vapour containing aqueous vapour.

An object of the present invention is to treat soybeans and defatted soybeans as a material for soy sauce brewing which resulting soy sauce has no potential turbidities, and that it is produced with an unusally high yield and high qualities; moreover, soybeans and defatted soybeans treated by the present invention can be used without retreatment by heat under the addition of water which must be carried out in an ordinary soy sauce brewing.

The present invention will be clearly understood from the following detailed description and the accompanying drawings in which:

FIG. 1 shows the course of the hydrolysis of native and heat-denatured soybean proteins by protease of *Aspergillus sojae;*

FIG. 2 shows the effect of long autoclaving for soybean proteins on the extent of the digestion by protease of *Aspergillus sojae;*

FIG. 3 shows the course of the hydrolysis of the autoclaved and alcohol treated soybean proteins by protease of *Aspergillus sojae;*

FIGS. 4, 5, and 6 shows the region of the effective conditions to complete denaturation of soybean proteins with methanol, ethanol, and isopropanol; and FIGS. 7 and 8 show the course of the hydrolysis of the autoclaved and alcohol-treated soybean proteins by pepsin and papain.

It has been usual practice in brewing soy sauce that soybeans have to be thoroughly autoclaved upon addition of water before introducing a mold of Aspergillus species into it. Imperfect steaming of the material will result in products in inferior quality. An inferior soy sauce may have no different appearance from an ordinary one. However, it would contain little aminonitrogen with poor savour. Furthermore, when it is diluted or heated, it produces a large amount of flocculent precipitation and can hardly be used for cooking. This is attributable to potential existence of turbid material in that type of soy sauce, the substance which has been determined as native soybean proteins by the inventor.

As the brewed soy sauce is formed when the soybean proteins are decomposed by proteases, the soybean proteins should be prepared into such a state as to be readily hydrolyzed by proteases of the mold. However, the native soybean proteins can not be rendered into that state except by an optimum heating, as an excessively high temperature results in a marked decrease of hydrolysis, while insufficient heating brings forth a product with potential turbidity (FIGS. 1 and 2). Therefore, an attempt to increase the yield from the soybeans has a limit as far as the heat treatment is concerned.

Another form of soy sauce is a chemical product prepared by dissolving the material with hydrochloric acid. The chemical soy sauce does not contain the potential turbid substance and shows a fairly good yield. However, its flavor is not so good as the brewed product, its quality being graded at a low level.

The product introduced here has been obtained through a great deal of experiments carried out on the basis of research by the present inventor by a method that may secure a high yield of soy sauce with none of those defects as mentioned above. In the present treatment an amount of ordinary soybeans or defatted soybeans is heated for 30 to 60 minutes in the presence of lower alcohols of a certain concentration. The heating temperature is dependent on varieties and concentration of alcohols to be used for this purpose. The treatment will render the soybean proteins into a state where it is easily hydrolyzed by proteases of the mold (FIG. 3). The material thus treated, though it would appear "raw," can be made into koji by adding water and inoculating the mold, without steaming as needed in case of ordinary soy sauce brewing. The soy sauce produced by this method has been proved to taste an excellent flavor and contain no potential turbid substance. In this method the yield is much higher than in the ordinary steaming method. Table I shows the comparison between the two.

TABLE I

Comparison in quality and yield between soy sauce produced by method of present invention and soy sauce by ordinary method

|  | Total Nitrogen (T-N), percent | Amino Nitrogen (A-N), percent | NaCl, percent | Direct Reducing Sugar, percent | Acidity | A-N/T-N, percent | Yield, percent | Potential Turbid Substance |
|---|---|---|---|---|---|---|---|---|
| Present Method | 1.803 | 1.075 | 17.00 | 2.76 | 0.95 | 59.6 | 89.3 | None. |
| Ordinary Method | 1.620 | 0.895 | 17.05 | 2.25 | 0.72 | 55.3 | 80.0 | Do. |

Relationship between the temperature of treatment and the concentration of each lower alcohols is expressed in the following inequalities, where $x$ represents the temperature of treatment (° C.) and $y$ represents the concentration of lower alcohols (vol. percent).

(1) Relationship between $x$ and $y$ in case of methanol:
$(-10x+620) \leq y \leq (10x-460)$ when $54 \leq x < 55$
$(-4x+290) \leq y \leq (2x-20)$ when $55 \leq x < 60$
$50 \leq y \leq 100$ when $60 \leq x \leq 120$ (2) Relationship between $x$ and $y$ in case of ethanol:
$50 \leq y \leq (15x/4-160)$ when $56 \leq x < 60$
$50 \leq y \leq (11x/5-67)$ when $60 \leq x < 65$
$50 \leq y \leq (4x/5+24)$ when $65 \leq x < 70$
$50 \leq y \leq (2x/3+100/3)$ when $70 \leq x < 100$
$50 \leq y \leq 100$ when $100 \leq x \leq 120$ (3) Relationship between $x$ and $y$ in case of isopropanol:
$50 \leq y \leq (3x/2-42.5)$ when $65 \leq x < 75$
$50 \leq y \leq (3x/5+25)$ when $75 \leq x < 100$
$50 \leq y \leq (x/2+35)$ when $100 \leq x \leq 120$ In FIGS. 4, 5, and 6 the relations described above are illustrated. Soy sauce produced under the conditions outside the hatched part is inferior in quality, containing native soybean proteins. The lower limit of concentration of alcohol is determined at 50 percent by considering such requirements as insolubility of soybean proteins into alcohol and drying efficiency of the material needed after the treatment. In addition, this invention has many advantages commercially, because the method may enable one to obtain such byproducts as soybean oil, lecithin, and carbohydrates etc.

Another method of the present invention relates to the treatment of soybean proteins, comprising treating soybeans or defatted soybeans with the vapour of lower alcohols or the said alcohol vapour containing aqueous vapor. When soybeans or defatted soybeans are treated with the vapour of lower alcohols or the said alcohol vapour containing the aqueous vapour under a certain condition, the effect of the vapour on the soybean proteins is the same as they are treated in the aqueous solution of alcohols. In the treatment by the lower alcohol vapour, neither soybean components soluble in alcohol solutions are dissolved out of the material, nor a large amount of alcohol is needed for treatment. When a small amount of water is added to the material before the treatment, the heating treatment is capable to be made at a lower temperature. In the following, operating conditions of the vapour of lower alcohols for soybeans or defatted soybeans are indicated.

(1) Operating conditions of treatment without addition of water to soybeans or defatted soybeans:

(a) *Treatment by saturated vapour.*—If soybeans or defatted soybeans without addition of water are treated at $t°$ C. with saturated vapour of a lower alcohol which is brought about when the aqueous lower alcohol solution of $c\%$ by volume is heated at $t°$ C. in a closed vessel until the vapour phase and the liquid phase come to the state of equilibrium, the complete treatment is brought about under the conditions shown in Table II between $t$ and C. There exists a corresponding range of $c$ to $t$. Soy sauce produced under a condition outside this range of $c$ is inferior in quality, having the potential turbid material.

TABLE II

*Relation between t and c for each lower alcohol*

|  | $t$ (° C.) | $c$ (vol. percent) |
|---|---|---|
| Methanol | 65 | 95–100 |
|  | 70 | 85–100 |
|  | 90 | 75–100 |
| Ethanol | 85 | approx. 90 |
|  | 87 | 85–90 |
|  | 90 | 80–95 |
|  | 100 | 75–100 |
| Isopropanol | 115 | 60–90 |
|  | 120 | 40–100 |

(b) *Treatment by unsaturated super-heated vapour.*—When soybeans or defatted soybeans without addition of water are treated under the ordinary atmospheric pressure, the vapour of the lower alcohols or the vapour mixture with the alcohol vapour and the aqueous vapour should be heated up to a temperature of more than 120° C.

The conditions in operation are shown in Table III, when the material is contacted with the vapour for about an hour. The temperature of the treatment is lowered by the addition of aqueous vapour to the lower alcohol vapour using for the treatment.

When the material is wet with the alcohol solutions, the treatment by unsaturated super-heated alcohol vapour not only causes the complete denaturation of the soybean proteins, but also serves to purge the alcohols retained by the material.

TABLE III

*Conditions of treatment by unsaturated super-heated alcohol vapours*

|  | Temp. of treatment | Aqueous vapour required in vapour mixture (Wt. percent) |
|---|---|---|
| Methanol | 140° C | More than 25%. |
|  | 150° C | Not required. |
| Ethanol | 140° C | More than 40%. |
|  | 150° C | Not required. |
| Isopropanol | 140° C | More than 30%. |
|  | 150° C | Not required. |

(2) Operating conditions of treatment after addition of water to soybeans or defatted soybeans:

When soybeans or defatted soybeans are treated by the vapour after a variable amount of water has been added to soybeans or defatted soybeans, the relationship among the temperature $(t)$, the concentration $(c)$, and the amount of the added water is shown in Table IV.

TABLE IV

*Relationship among t, c, and added water*

|  | $t$ (° C.) | C (vol. percent) | Added Water/ Material (percent) |
|---|---|---|---|
| Ethanol | Each boiling point | 8 | More than 90. |
|  |  | 20 | More than 60. |
|  |  | 50 | More than 30. |
|  |  | 80 | More than 10. |
|  |  | 90 | More than 20. |
|  |  | 100 | More than 60. |
| Ethanol | 60 | 80 | More than 80. |
|  |  | 90 | More than 100. |
|  |  | 100 | More than 120. |
| Isopropanol | Each boiling point | 8 | More than 100. |
|  |  | 20 | More than 60. |
|  |  | 50 | More than 40. |
|  |  | 80 | More than 50. |
|  |  | 90 | More than 80. |
|  |  | 100 | More than 110. |

The essential operating conditions for vapour treatment of soybeans or defatted soybeans have been described above. At the treatment, however, air should be expelled as much as possible because it prevents soybean proteins from contact with alcohol vapour.

Example of treatments of the present inventions are as follows.

EXAMPLE 1

Defatted or undefatted soybean flakes were put into a vessel which has a refluxed-condenser and 99 vol. percent methanol solution was added in a sufficient amount to soak the mass of material. After having been boiled for 40 minutes under the ordinary atmospheric pressure the treated material was separated from the methanol solution and dried.

EXAMPLE 2

Defatted or undefatted soybean flakes were put into a vessel which has a refluxed-condenser and 84 vol. percent ethanol solution was added in a sufficient amount to soak the mass of material. After having been boiled for 40 minutes under the ordinary atmospheric pressure, the treated material was separated from the ethanol solution and dried.

EXAMPLE 3

Flaked soybeans were put into a vessel which has a reflux-condenser and were defatted by 95 vol. percent ethanol solution at 76–78° C. according to the ordinary method of the hot ethanol extraction under the ordinary atmospheric pressure. After the extraction of the oil, a little amount of water was added into the vessel until the concentration of the ethanol solution in the vessel became 84 vol. percent and then the resulting solution was heated for 40 minutes at the boiling point. After having been separated from the solution, the treated material was dried.

EXAMPLE 4

After the flaked soybeans were put into the vessel and defatted by 95 vol. percent ethanol solution at 76–78° C. according to the ordinary method of the hot ethanol extraction under the ordinary atmospheric pressure, the resulting defatted flakes were separated from the ethanol solution. Then, the vessel containing the said defatted flakes was heated up to and kept at a temperature of 95–100° C. for 30–60 minutes, whereby the ethanol solution remaining upon and retained by the defatted flakes was vapourized and as the result the proteins in the defatted flakes were denatured completely. After that, the treated material was dried.

EXAMPLE 5

Defatted or undefatted soybean flakes were put into a closed vessel and 95 vol. percent ethanol solution was added in a sufficient amount to soak the mass of material for 60 minutes at 95° C. under the raised vapour pressure, the treated material was separated from the ethanol solution and dried.

EXAMPLE 6

Defatted or undefatted soybean flakes were put into a vessel which has a reflux-condenser and 70 vol. percent isopropanol solution was added in a sufficient amount to soak the mass of material. After having been boiled for 60 minutes under the ordinary atmospheric pressure, the treated material was separated from the isopropanol solution and dried.

EXAMPLE 7

Defatted or undefatted soybean flakes were put into a vessel and 80 vol. percent isopropanol solution was added in a sufficient amount to soak the mass of material. After having been heated for 60 minutes at 95° C. under the raised vapour pressure, the treated material was separated from the isopropanol solution and dried.

EXAMPLE 8

Defatted or undefatted soybean flakes were put on a porus plate equipped in a closed vessel. A small quantity of 90 vol. percent ethanol was put under the plate of the vessel. After air in the vessel was removed by a suitable means, the vessel was heated and the vapour in it was kept for 60 minutes at 95° C. under the raised vapour pressure. Then the treated material was dried.

EXAMPLE 9

Defatted or undefatted soybean flakes were put into a vessel which has a reflux-condenser and were brought into contact, under the ordinary atmospheric pressure at the temperature of the boiling point for 60 minutes, with the methanol vapour from the boiling methanol solution of 99% by volume. Then the treated material was dried.

EXAMPLE 10

Defatted or undefatted soybean flakes were put on a porous plate equipped in a closed vessel. A small quantity of 90 vol. percent isopropanol solution was put under the plate of the vessel. After air in the vessel was removed by a suitable means, the vessel was heated and the vapour in it was kept for 60 minutes at 115° C. under the raised vapour pressure. Then the treated material was dried.

EXAMPLE 11

After water equal to 30% by weight of defatted soybean flakes was sprayed to those flakes, that sprayed material was put on a porous plate equipped in a vessel having a relux-condenser. A small quantity of 50 vol. percent ethanol solution was put under the plate of the vessel and the ethanol solution was boiled under the ordinary atmospheric pressure. After the sprayed material was treated for 60 minutes by the evaporated vapour, it was dried.

EXAMPLE 12

Whole soybeans were flaked, put into a vessel, and defatted by the ethanol of 95% by volume at 76–78° C. according to the ordinary method of the alcohol extraction of the oil under the ordinary atmospheric pressure. The resulting defatted soybean flakes were separated from the ethanol solution and subjected to contact, at 150° C. for 30–60 minutes, with the super-heated ethanol vapour under the ordinary atmospheric pressure and then the ethanol remaining in the treated flakes was removed.

EXAMPLE 13

Defatted soybean flakes were put into a vessel and subjected to contact with the super-heated vapour mixture of ethanol and water (50:50) for 60 minutes at 140° C. under the ordinary atmospheric pressure. And then the ethanol remaining in the treated flakes was removed.

EXAMPLE 14

Defatted soybean flakes were put into a vessel and subjected to contact with the super-heated vapour mixture of methanol and water (70:30) for 60 minutes at 140° C. under the ordinary atmospheric pressure. And then the methanol remining in the treated flakes was removed.

EXAMPLE 15

Defatted soybean flakes were put into a vessel and subjected to contact with the super-heated vapour mixture of isopropanol and water (60:40) for 60 minutes at 140° C. under the ordinary atmospheric pressure. And then the isopropanol remaining in the treated flakes was removed.

EXAMPLE 16

Defatted soybean flakes were put into a vessel and subjected to contact with the super-heated methanol, ethanol, or isopropanol vapor for 30–60 minutes at 150° C. under the ordinary atmospheric pressure. And then the methanol, ethanol, or isopropanol remaining in the treated flakes was removed.

It may be worth noting that the material treated by the present invention with alcohols of a liquid state or a vapour state contains a greater amount of digestible protein than those treated with ordinary autoclaving. Therefore, the present treatment is capable of rendering the material more decomposable than can the ordinary treatment, not only with proteases of Aspergillus species but also with pepsin and papain (FIGS. 6 and 7). Furthermore, the product contains no trypsin inhibitor (Table V). As is described above, the present invention is considered as a high contribution to mold industries as those of soy sauce, miso and so forth.

TABLE V

*Comparison of trypsin inhibitor content between alcohol-treated and steamed soybean flakes*

| | Content of trypsin inhibitor units |
|---|---|
| Native soybean flakes | $69 \times 10^{-2}$ |
| Steamed soybean flakes | $0.0 \times 10^{-2}$ |
| Alcohol-treated soybean flakes | $0.0 \times 10^{-2}$ |

What is claimed as new and desired to be secured by Letters Patent of the United States is:

1. The method of producing soy sauce comprising treating a material selected from the group consisting of soybean and defatted soybean with an aqueous solution of methanol for 30–60 minutes wherein the relationship between the treating temperature ($x°$ C.) and the concentration of the said aqueous methanol solution ($y$ percent by volume) is substantially as follows:

$(-10x+620) \leq y \leq (10x-460)$, when $54 \leq x < 55$;
$(-4x+290) \leq y \leq (2x-20)$, when $55 \leq x < 60$;
and $50 \leq y \leq 100$, when $60 \leq x \leq 120$, simultaneously heating to a temperature of 54–120° C. wherein said temperature is determined according to the above-stated relationship, removing said aqueous methanol solution, and thereafter directly hydrolyzing said treated soybean protein with proteases without prior hot aqueous pretreatment.

2. The method of producing soy sauce comprising treating a material selected from the group consisting of soybean and defatted soybean with an aqueous ethanol solution for 30–60 minutes wherein the relationship between the treating temperature ($x°$ C.) and the concentration of the said aqueous ethanol solution ($y$ percent by volume) is substantially as follows:

$50 \leq y \leq (15x/4 - 160)$, when $56 \leq x < 60$;
$50 \leq y \leq (11x/5 - 67)$, when $60 \leq x < 65$;
$50 \leq y \leq (4x/5 + 24)$, when $65 \leq x < 70$;
$50 \leq y \leq (2x/3 + 100/3)$, when $70 \leq x < 100$; and
$50 \leq y \leq 100$, when $\leq 100 x \leq 120$, simultaneously heating to a temperature of 54–120° C. wherein said temperature is determined by the above-stated relationship, removing said aqueous lower alcohol solution, and thereafter directly hydrolyzing said treated soybean protein with proteases without prior hot aqueous pretreatment.

3. The method of producing soy sauce comprising treating a material selected from the group consisting of soybean and defatted soybean with an aqueous isopropanol solution for 30–60 minutes wherein the relationship between the treating temperature ($x°$ C.) and the concentration of the said aqueous ethanol solution ($y$ percent by volume) is substantially as follows:

$50 \leq y \leq (3x/2 - 42.5)$, when $65 \leq x < 75$;
$50 \leq y \leq (3x/5 + 25)$, when $75 \leq x < 100$; and
$50 \leq y \leq (x/2 + 35)$, when $100 \leq x \leq 120$, removing said aqueous isopropanol solution, and thereafter directly hydrolyzing said treated soybean protein with proteases without prior hot aqueous pretreatment.

4. The method of producing soy sauce comprising treating a material selected from the group consisting of soybean and defatted soybean with a vaporous mixture of methanol and water for 30–60 minutes at a temperature of 65–90° C. wherein the percent alcohol ranges from at least 95% to at least 75% and wherein the lower limit of the percent alcohol varies inversely with the temperature, removing said alcoholic treating vapor, and thereafter directly hydrolyzing said treated soybean protein with proteases without prior hot aqueous pretreatment.

5. The method of producing soy sauce comprising treating a material selected from the group consisting of soy bean and defatted soybean with a vaporous mixture of ethanol and water for 30–60 minutes at a temperature of 85–100° C. wherein the percent alcohol ranges from at least 90% to at least 75% and wherein the lower limit of the percent alcohol varies inversely with the temperature, removing said alcoholic treating vapor, and thereafter directly hydrolyzing said treated soybean protein with proteases without prior hot aqueous pretreatment.

6. The method of producing soy sauce comprising treating a material selected from the group consisting of soybean and defatted soybean with a vaporous mixture of isopropanol and water for 30–60 minutes at a temperature of 115–120° C. and wherein the percent alcohol ranges from at least 60% to at least 40% and wherein the lower limit of the percent alcohol varies inversely with the temperature, removing said alcoholic treating vapor, and thereafter directly hydrolyzing said treated soybean protein with proteases without prior hot aqueous pretreatment.

7. The method of producing soy sauce comprising treating a material selected from the group consisting of soybean and defatted soybean with a vaporous material selected from the group consisting of the unsaturated super-heated vapors of methanol, ethanol, and ispropanol, and a vapor mixture of methanol and water, ethanol and water, and isopropanol and water for 30–60 minutes, simultaneously heating to a temperature of 140–150° C., removing said alcoholic treating vapor, and thereafter directly hydrolyzing said treated soybean protein with proteases without prior hot aqueous pretreatment.

References Cited by the Examiner
UNITED STATES PATENTS

| | | | |
|---|---|---|---|
| 1,394,236 | 10/21 | Togano | 99—145 |
| 1,398,613 | 11/21 | Watson | 106—202 |
| 2,444,241 | 6/48 | Beckel et al. | |
| 2,561,333 | 7/51 | Beckel et al. | 99—17 |
| 2,585,793 | 2/52 | Kruse | 99—17 X |

OTHER REFERENCES

"Soybeans and Soybean Products," vol. I, by Markley, Interscience Publishers, Inc., New York, 1950, pages 281–284.

A. LOUIS MONACELL, *Primary Examiner.*

ABRAHAM H. WINKLESTEIN, BEATRICE H. STRIZAK, *Examiners.*